United States Patent
Bruns (10) Patent No.: US 7,214,015 B2
(45) Date of Patent: May 8, 2007

(54) APPARATUS FOR MOUNTING LASHING DEVICES IN A FREIGHT LOADING SYSTEM OF A TRANSPORT CONVEYANCE, PARTICULARLY AN AIRCRAFT

(75) Inventor: Johannes Bruns, Gehlenberg (DE)

(73) Assignee: Airbus Deutschland GmbH, Hamburg (DE)

( * ) Notice: Subject to any disclaimer, the term of this patent is extended or adjusted under 35 U.S.C. 154(b) by 103 days.

(21) Appl. No.: 10/859,443

(22) Filed: Jun. 1, 2004

(65) Prior Publication Data
US 2004/0258498 A1 Dec. 23, 2004

(30) Foreign Application Priority Data
May 30, 2003 (DE) ................. 103 24 648

(51) Int. Cl.
*B60P 7/08* (2006.01)
(52) U.S. Cl. ............... 410/102; 410/107; 410/115
(58) Field of Classification Search ........... 410/7, 410/8, 102, 104–106, 115, 107, 111; 24/265 CD, 24/115 K; 248/499; 244/118.1, 137.1
See application file for complete search history.

(56) References Cited

U.S. PATENT DOCUMENTS

| 3,693,920 | A | | 9/1972 | Trautman | |
|---|---|---|---|---|---|
| 4,493,470 | A | * | 1/1985 | Engel | |
| 4,715,754 | A | | 12/1987 | Scully | |
| 4,850,769 | A | * | 7/1989 | Matthews | 410/105 |
| 4,907,921 | A | * | 3/1990 | Akright | 410/111 |
| 5,076,745 | A | * | 12/1991 | Klein | 410/94 |
| 5,112,173 | A | | 5/1992 | Eilenstein et al. | |
| 5,234,297 | A | | 8/1993 | Wieck et al. | |
| 6,030,159 | A | | 2/2000 | Herrick et al. | |
| 6,138,975 | A | | 10/2000 | McDaid | |
| 6,374,466 | B1 | | 4/2002 | Macias | |
| 6,533,512 | B2 | | 3/2003 | Lin | |
| 7,086,815 | B2 | * | 8/2006 | Bruns | 410/107 |
| 2004/0265087 | A1 | | 12/2004 | Bruns | |
| 2004/0265088 | A1 | | 12/2004 | Borrmann et al. | |

FOREIGN PATENT DOCUMENTS

| DE | 2161735 | 7/1972 |
|---|---|---|
| DE | 3943077 | 7/1991 |
| DE | 4102274 | 1/1992 |
| EP | 0894713 | 2/1999 |

* cited by examiner

*Primary Examiner*—Stephen Gordon
(74) *Attorney, Agent, or Firm*—W. F. Fasse; W. G. Fasse (57) ABSTRACT

A freight lashing channel (18) for a transport conveyance is constructed for mounting a plurality of spaced lashing devices (10) in the channel. Each lashing device (10) has a base (14) and a bail (11) journalled to the base (14). The bail takes up a recessed position within the lashing channel (18) or a working position out of the channel. In the recessed position the channel (18) is closed by a cover plate formed with a load mounting rail (33) for a rapid change-over from a freight lashing function to a seat mounting function. The lashing channel is either a separate unit or it is integrated into a floor panel or it is formed between two floor panel sections. Reinforcing load take-up elements (30) are mounted within the channel between neighboring lashing devices.

29 Claims, 10 Drawing Sheets

APPARATUS FOR MOUNTING LASHING DEVICES IN A FREIGHT LOADING SYSTEM OF A TRANSPORT CONVEYANCE, PARTICULARLY AN AIRCRAFT

CROSS-REFERENCE TO RELATED APPLICATIONS

This application is related to U.S. patent application Ser. No. 10/859,440 and to U.S. patent application Ser. No. 10/859,437 issued as U.S. Pat. No. 7,086,815 on Aug. 8, 2006 both filed on Jun. 1, 2004. The entire disclosure of application Ser. No. 10/859,437 is incorporated herein by reference.

PRIORITY CLAIM

This application is based on and claims the priority under 35 U.S.C. §119 of German Patent Application 103 24 648.7, filed on May 30, 2003, the entire disclosure of which is incorporated herein by reference.

FIELD OF THE INVENTION

The invention relates to an apparatus for mounting or securing at least one lashing device to a freight carrying floor of a freight conveyance such as an aircraft. The lashing device is constructed for lashing a load in a secure position for preventing the load from changing its position in an uncontrolled manner.

BACKGROUND INFORMATION

Transport conveyances such as aircraft are used for conveying or transporting freight as well as passengers. One and the same aircraft may, for example, be used during daytime for the transport of passengers while operating at night for transporting freight. Such a system must permit the loading and lashing of freight items or the latching or locking of passenger seats in such a way that a conversion from transporting freight to carrying passengers and vice versa is rapidly possible. The freight loading systems must thus be flexible and the change over from freight transportation to passenger carrying and vice versa must be performable, not only rapidly, but also by a minimum of service personnel.

Moreover, the pieces of freight to be transported may have rather diverse features. On the one hand there are standardized containers and pallets. On the other hand there are nonstandardized loads, for example bags or vehicles lashed to supporting chip boards to be transported. Such freight items are relatively heavy and thus impose high requirements regarding the statics and construction of the loading floor and of the lashing points which must have the strength to safely take-up the loads. Furthermore for special missions special additional loading floor systems may be required for securing for example medical supply units to the freight loading floor. Particularly in emergency situations it is necessary that the different possibilities of use can be realized in an extremely short change over time and by a minimum number of maintenance personnel.

Conventional systems use pallets on which passenger seats are mounted for carrying passengers. Such pallets can be secured to the freight deck. If the aircraft is to be used for the transportation of freight, the pallets are removed, whereby the conventional function units on the freight deck become accessible. Such conventional function units comprise, for example, lashing devices, roller units for rolling freight items into lashing positions, latching elements, and guide rails. Once the pallets with passenger seats have been removed, freight pallets or containers loaded with freight can be secured to the loading floor instead of the seat carrying pallets.

Figure 1:
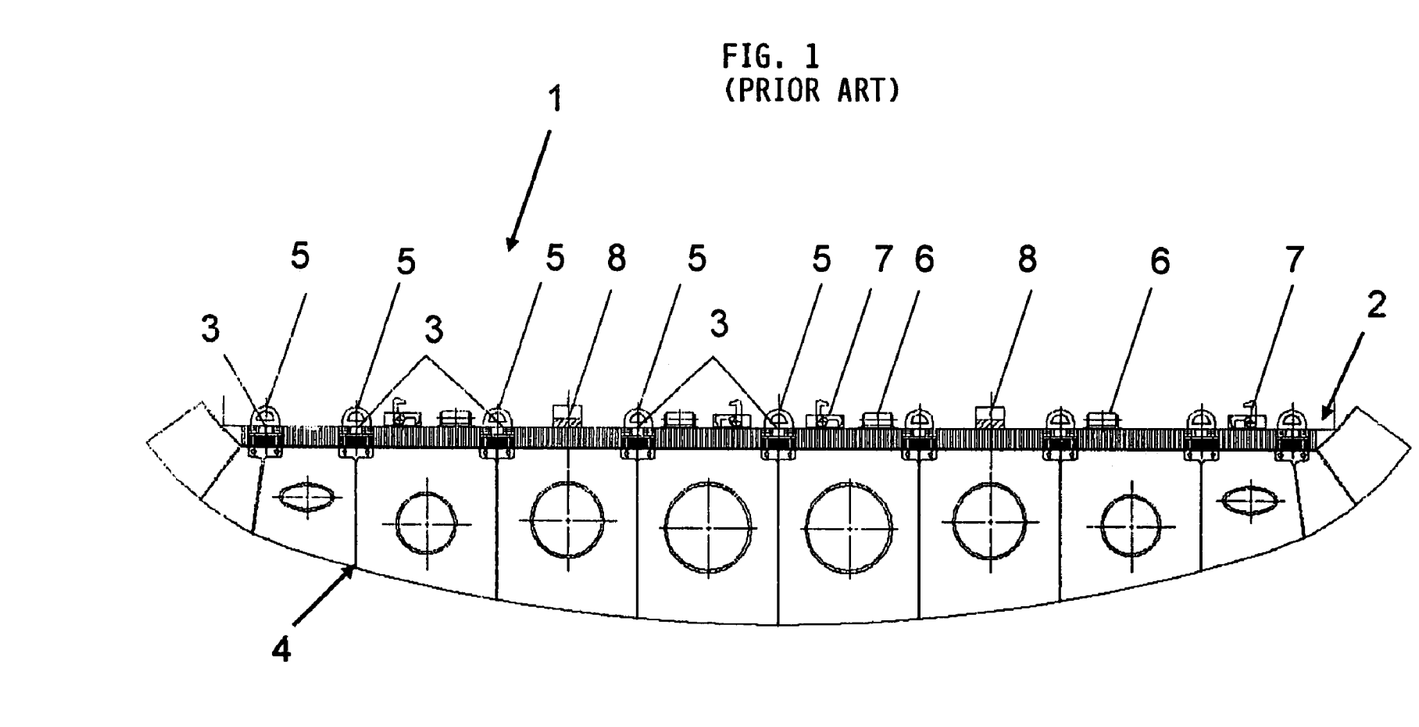
FIG. 1 is a sectional view through a conventional loading floor of a freight deck of an aircraft.

Conventionally it is also possible to alternatively mount passenger seats directly on the freight deck or loading floor. However, for this purpose additional mounting possibilities are required. Conventionally, mounting rails or lashing points or devices are constructed to function as mounting interface locations to which either passenger seats or the mentioned function units can be secured on the freight loading floor. FIG. 1 shows an arrangement of function elements on the freight loading floor. So-called lashing points are provided for lashing of loads to the loading floor by means of a lashing ring. Each lashing point includes at least one lashing ring. Numerous lashing points are distributed on the loading floor in the freight space and mostly at uniform spacings from one another. Each lashing point is generally secured directly to the aircraft frame structure in order to be able to take up the forces and moments that are effective on the lashing point in all directions. In case the lashing points of a freight loading system are intended to be used for the mounting of further components or systems such as passenger seats, it is necessary to replace the lashing devices intended for freight purposes by latching devices constructed for mounting and securing passenger seats. Such replacement operation of lashing devices by latching components is time consuming and may well result in the loss of loose components of the lashing devices.

OBJECTS OF THE INVENTION

In view of the foregoing it is the aim of the invention to achieve the following objects singly or in combination:
- to provide a lashing device that does not need to be replaced in case a conversion from freight transportation to passenger carrying and vice versa is necessary;
- to provide a lashing device that is capable of latching and/or lashing freight items of any kind;
- to assure that the retooling can be performed in a simple, reliable, yet flexible and time saving manner so that a freight loading system of an aircraft can be rapidly converted to a passenger carrying system; and
- to provide, in addition to the lashing possibility, interface locations for a simple installation of further systems such as seats, roller systems, medical supply devices such as stretchers for sick or injured persons and further functional elements such as latches for pallets and containers, load take up units and/or latching systems for vehicles including trucks, and ISO-container latching systems.

SUMMARY OF THE INVENTION

The above objects have been achieved according to the invention by an apparatus for mounting lashing devices to a loading floor of a transport conveyance, wherein the apparatus comprises a lashing channel including two channel side walls and a channel bottom plate interconnecting said channel side walls, a plurality of lashing devices mounted spaced from one another at lashing positions in said lashing channel for lashing freight items to said loading floor, said lashing devices further comprising mountings for securing channel covers to said lashing devices.

The basic concept of the invention comprises a lashing channel or a plurality of lashing channels secured to the loading floor or a floor panel or floor element with a lashing channel or a portion of a lashing channel integrated in the floor panel or element. At least one lashing point is provided in each of these lashing channels. As a result, flexible or rather versatile connection possibilities are provided for securing freight transport components or passenger carrying components to a channel or a channel system in a rapid, simple and reliable advantageous manner. Depending on the transport problem or requirement at hand, the retooling or conversion can be accomplished rapidly by a minimum of service personnel. The present lashing channel or system with the lashing devices installed therein is constructed for performing multi functions, whereby changes and adaptations required by customers buying an aircraft can be made without or by at least minimizing expensive new or individual developments. The flexible use of convertible adapter or cover plates, load take up adapters and lashing devices assures an easy handling of any required adaptation to satisfy any transport or carrying requirement. Further, the apparatus according to the invention realizes a weight saving solution while achieving the above outlined objects. More specifically, in addition to or instead of the lashing devices, other easily exchangeable components can be installed in the latching channel, whereby no additional expensive connecting points are required in the structure. A still further advantage is seen in that the construction or cross-sectional configuration of the channels combined with a flow passage in the lashing devices provides for a simple draining of the channel and any components installed in the channel. Such flow passages also facilitate passing heated air through the channel or channels.

BRIEF DESCRIPTION OF THE DRAWINGS

In order that the invention may be clearly understood, it will now be described in connection with example embodiments thereof, with reference to the accompanying drawings, wherein.

DETAILED DESCRIPTION OF A PREFERRED EXAMPLE EMBODIMENT AND OF THE BEST MODE OF THE INVENTION

FIG. 1 shows a sectional view through a conventional aircraft deck 1 formed by a loading floor 2. If an aircraft is intended to carry passengers, pallets carrying passenger seats are mounted to the aircraft deck 1. If the aircraft is intended for transporting freight, as shown in FIG. 1, the pallets and seats mounted thereon are removed, whereby conventional function units installed in or on the deck 1 become accessible. Such conventional function units include lashing points or lashing devices 3 with lashing rings 5, roller systems 6, latching or locking elements 8 and guide rails 7. As a result, freight pallets or containers loaded with freight can be secured to the floor 2 instead of seat carrying pallets. Numerous lashing points or rather lashing devices 3 are mounted to the aircraft s deck 1 formed by the loading floor 2, whereby these lashing devices are uniformly spaced from one another throughout the deck 1. The just mentioned function elements are generally secured directly to an aircraft frame structure 4, whereby the lashing rings 5 can take up substantial static forces.

Seats and other systems such as medical supply units including carrying stretchers and further guide rails 7 can be alternatively mounted directly to the aircraft deck 1 which in turn is mounted to the aircraft frame structure. However, for this purpose additional mounting possibilities are required or the lashing devices 3 constructed for taking up large forces, must be retooled. Such retooling may involve, for example, the removal of the latching rings 5. Such a ring removal is time consuming.

Figure 2:
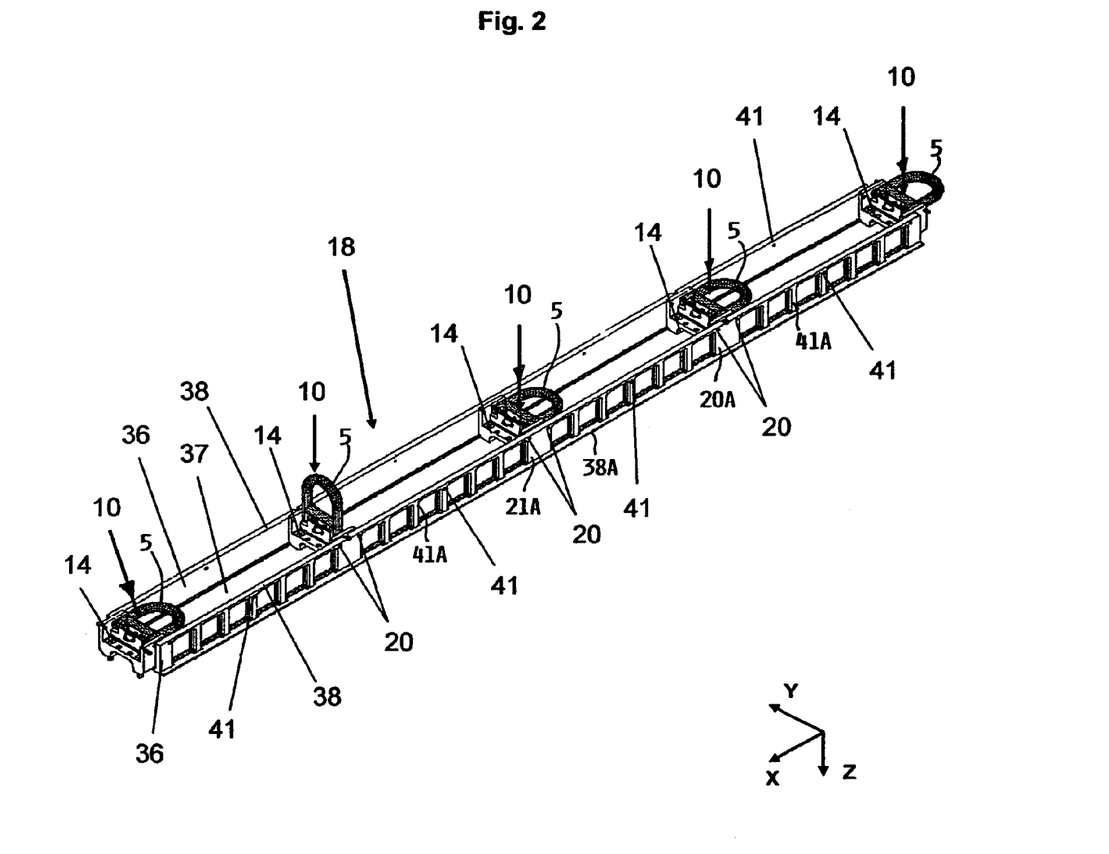
FIG. 2 is a perspective view of a lashing channel according to the invention with five lashing devices.

The perspective view of FIG. 2 shows a lashing channel 18 according to the invention. The lashing channel 18 comprises a bottom plate 37 interconnecting two channel side walls 36 provided, in this example, with upper flanges 38 and lower flanges 38A. Holes 20 and 41 in the channel side walls 36 provide possibilities for securing the lashing channel 18 to the loading floor 2 shown in FIG. 1. The connecting holes 20 are provided in channel side wall locations 20A where lashing devices 10 are mounted in the lashing channel 18. The connecting holes 41 are provided in the channel side walls 36 where side wall reinforcing posts 41A are positioned. The lashing channel 18 has mounted therein, for example, five lashing devices 10 to be described in more detail below. Each lashing device 10 comprises a mounting base 14 for securing the lashing device 10 to the lashing channel 18 and for journalling a bail 5 to the base 14. For this purpose the base 14 has mounting bores shown in FIG. 9. The latching devices 10 are preferably spaced from one another at uniform spacings along the channel 18. Preferably, the channel 18 with its lashing devices 10 is secured to the supporting frame structure 4 through the mounting bores in the base 14 as will be described in more detail with reference to FIGS. 3 and 4.

Figure 3:
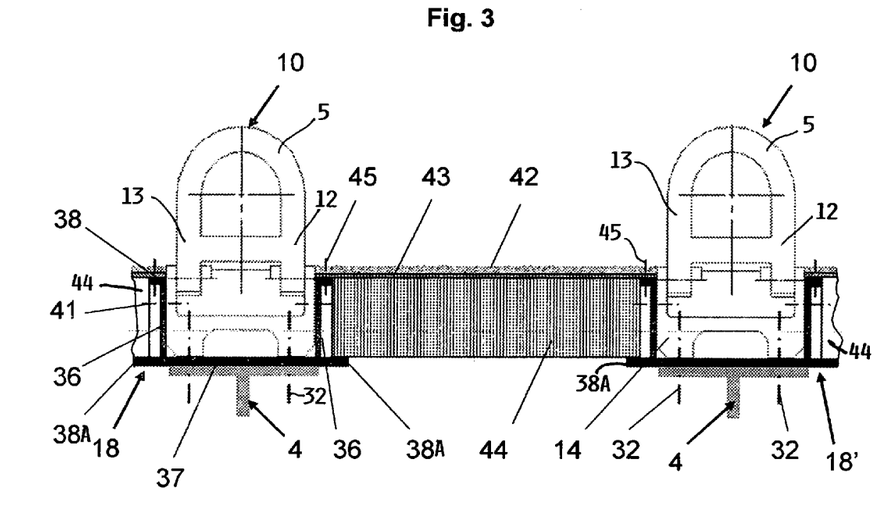
FIG. 3 is a sectional view through two neighboring lashing channels in a first floor construction.
Figure 4:
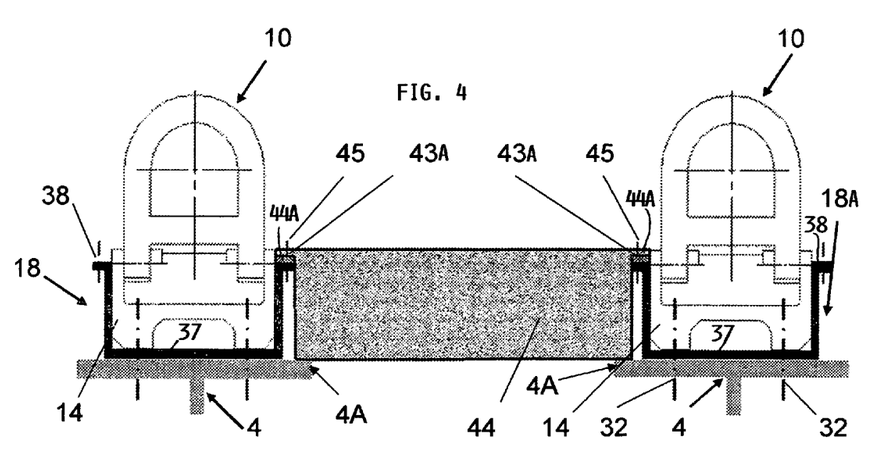
FIG. 4 is a sectional view similar to that of FIG. 3, but illustrating a second, different floor construction.

FIGS. 3 and 4 illustrate two advantageous integrations of two lashing channels 18 and 18A with floor panels 44 and with the support frame 4. The side walls 36 of the channels 18, 18A are positioned between floor panels 44, whereby a plane loading floor is formed.

FIG. 3 shows how the outwardly facing side walls 36 and the downwardly facing bottom plate 37 of the channels 18, 18A serve simultaneously as carriers for the floor panels 44. For this purpose the channel side walls comprise upper lateral flanges 38 and the bottom plate 37 forms lower flanges 38A extending laterally away from the corners where the side walls 36 meet the bottom plate 37. A sealing element 43 of the panel 44 rests on the upper flanges 38 to which the sealing element 43 is secured, for example by screws 45. A floor covering such as a wear plate 42 may cover the sealing element 43. The lower edges of the floor panel 44 rest on the lateral flanges 38A of the bottom plate 37.

The above described construction is capable of transmitting forces that are imposed on the floor panels 44 through the lashing channels 18 into the supporting frame 4. Further, the combination of a sealing element 43 with a wear plate 42 protects the floor panel 44 and any components positioned below the floor 2.

Preferably, the lashing channel 18 is installed in the aircraft with the aid of the lashing devices 10 on the supporting frame 4 that may, for example be the spars of the aircraft frame structure. The mounting screws 45 and 32 extend in the Z-direction which is the vertical direction as viewed in a three-dimensional coordinate system with the X-direction extending parallel to the longitudinal central axis of the aircraft body. Screws 32 pass through the bottom plate 37 of the channel 18 into the frame 4. The bores 41 passing through the reinforcements 41A forming part of the side walls 36 of the lashing channel 18 provide further mounting possibilities. The same applies to the bores 20 passing through the channel side wall locations 20A which can receive further mounting screws. By using several of these mounting and connection possibilities, large forces and moments imposed on the loading floor can be transmitted to the frame 4 through the lashing devices 10 than was possible heretofore.

FIG. 3 illustrates the arrangement of two neighboring lashing channels 18 and 18A with a floor panel 44 positioned between the two channels 18 and 18A. The floor panel 44 may comprise an extruded sectional profile or a fiber composite structural component or a milled profile, whereby the floor panel 44 secured to the lashing channels 18, 18A can participate in any load distribution, for example when pressure loads are imposed on the loading floor by vehicle tires mentioned above. The floor panel 44 and any structures including system components below the panel 44 are protected by the sealing element 43 and by the wear plate 42 against dirt and moisture. A proper sealing is important in order to prevent liquids and dirt from entering into the freight space floor 2 and any space below the floor. Rather, it is important that an intended discharge or drainage of liquids and dirt is accomplished through the lashing channels 18, 18A as will be described in further detail below. The wear plate 42 is exposed to high adverse mechanical influences, because it forms a traffic surface. Substantial loads are imposed on the traffic surface, for example by tires or caterpillar treads traveling on the loading floor. However, such loads can be effectively passed into the frame 4 through the wear plate 42 by the screws 45 through the channel flanges 38 and through the flanges 38A which carry the floor panel 44. The flanges 38A are extensions of the bottom plate 37 of the channel 18 and carry the floor plate 44 which thus rests on the chord of the frame 4. This type of mounting assures a simple or rather easy exchangeability of the wear plate 42 and possibly of the sealing 43 with little effort and expense. Particularly, when the wear plate 42, the sealing 43 and/or the floor panel 44 are damaged, their exchange can be performed simply and rapidly. Similarly, this feature also provides access to other systems that may be positioned or mounted below the floor. Thus, the inexpensive opening or exchanging of the plates 42 and panels 44 including the sealing 43 is of significant importance.

FIG. 4 illustrates a further embodiment, wherein two lashing channels 18 and 18A are arranged in parallel with each other with a spacing that is filled by a floor panel 44. Each channel 18, 18A has laterally extending top flanges 38 on which corresponding edge flanges 44A of the floor panel 44 rest. Sealing strips 43A inserted between the flanges 38 and 44A assure that moisture and dirt cannot enter into the space within the floor and below the floor, thereby protecting system components installed below the floor. The sealing strips 43A assure that any liquid or dirt is guided into the lashing channels 18, 18A. For this purpose any top or cover plates that close the lashing channels are provided with cut-outs 28 as, for example, seen in FIG. 11 and as will be described in more detail below.

Compared to the embodiment of FIG. 3, the bottom plates 37 of the lashing channels 18, 18A of the embodiment shown in FIG. 4 do not have any bottom flanges 38A. Rather, the top chords 4A of the frame 4 are wider and project laterally beyond the bottom plate 37 so that lower edges of the floor panels 44 rest on the wider top chord 4A of the frame 4. By avoiding the projecting flanges 38A the lashing channels of FIG. 4 have been simplified and the substantially U-sectional profile of these channels 18, 18A is well suited for extrusion manufacturing.

Figure 5:
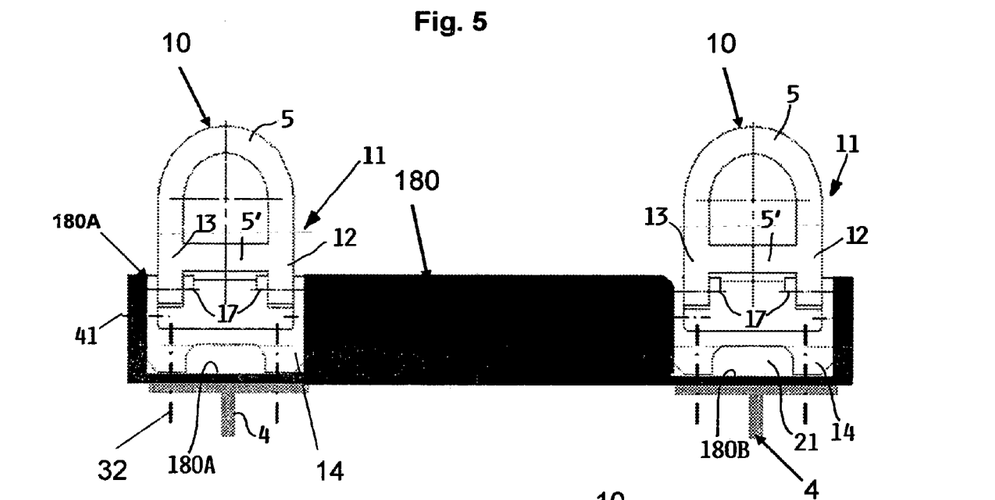
FIG. 5 is a sectional view with two lashing channels integrated into a loading floor panel.

FIG. 5 shows a further embodiment of lashing channels 180A and 180B according to the invention directly incorporated into a floor panel 180. These channels 180A and 180B extend longitudinally along the edges of the floor panel 180. The lashing devices 10 are the same as described above with reference to the first embodiment. Each lashing device 10 comprises a base 14 secured to the bottom of the channels 180A and 180B by securing elements 32 such as screws that pass through the bottom of the respective channel and into the support frame 4, for example of an aircraft. Each lashing device 10 comprises a bail section 11 that includes a ring portion 5 extending into bail legs 12 and 13 journaled at 17 to the base 14.

Figure 6:
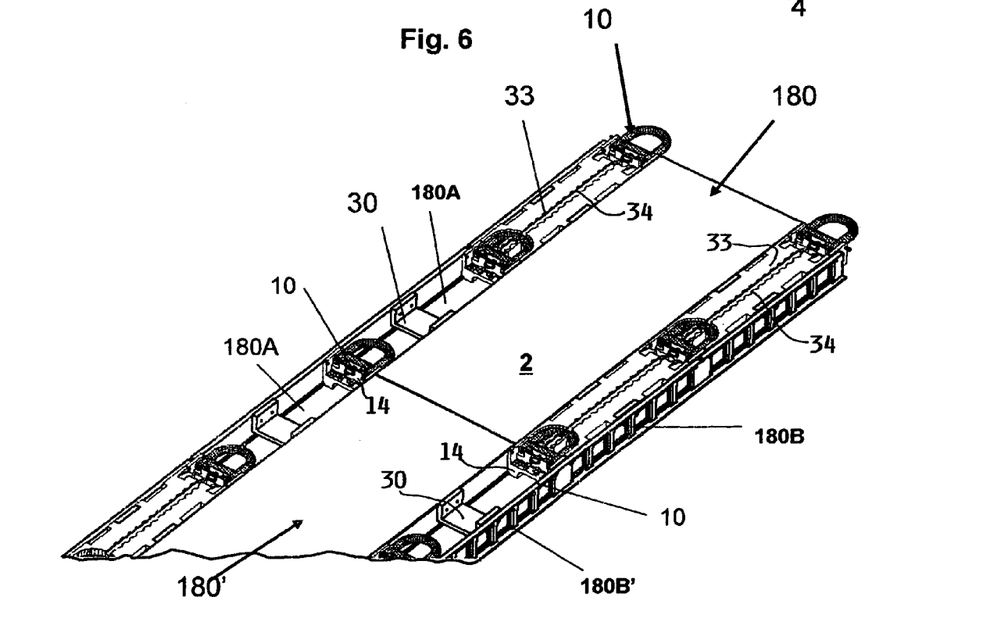
FIG. 6 is a perspective view of the two lashing channels of FIG. 5.

FIG. 6 shows how a portion of a loading floor 2 formed by two floor panels 180 and 180' each provided with two lashing channel sections 180A and 180B integrated into the respective floor panel 180 and 180'. Preferably, top or cover plates 33 preferably provided with seat mounting guide grooves or slots 34 are secured to each channel section 180A, 180B. Similarly, reinforcements 30 are preferably mounted in the channel sections between neighboring lashing devices 10.

By securing the lashing devices 10 to the bottom of the lashing channel and to the support frame 4 with the same screws 32, a direct introduction of loads into the support 4 is achieved. Additionally, each lashing device 10 is preferably connected to the floor panels 180, 180A by screws or the like passing through bores 41 through panel portions that form the side walls of the channels.

Referring further to FIG. 6, the lashing devices 10 also function as bridging elements between neighboring floor panels 180, 180', whereby the respective base 14 is secured to channel bottoms of both panels and to the respective supporting frame 4. Aligning the channel sections and accordingly the floor panels longitudinally provides, for example a heating channel for all the components mounted in the channel so that freeze up, for example of the bail sections 11 in the channels is avoided, whereby the functionality of the freight loading system is assured even if an aircraft loading floor is exposed to extreme cold conditions.

Figure 7:
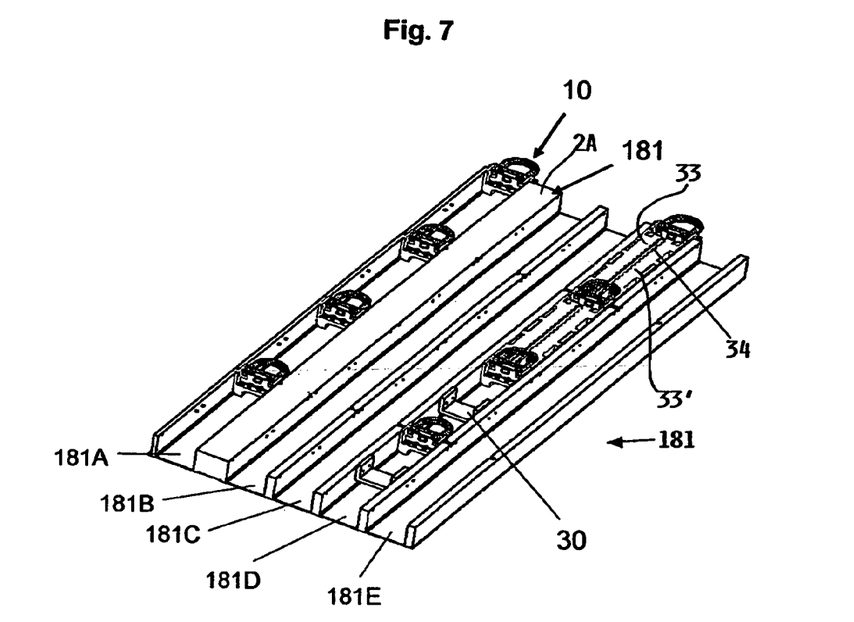
FIG. 7 is a perspective view of a supporting floor structure with a plurality of lashing channels integrated into the supporting floor structure.

FIG. 7 illustrates a perspective view of a multi channel floor panel 181 which is equipped, for example, with a total of five channels 181A, 181B, 181C, 181D and 181E. A wider spacing forming a floor treading surface 2A is provided between channels 181A and 181B. At least two channels are equipped with the lashing devices 10, whereby again connections between the panel 180 and the frame 4 pass through the lashing devices 10. The supporting frame 4 is not shown in FIG. 7. Cover plate sections 33 and 33' are used to cover the channels in which lashing devices 10 are installed. These cover plate sections 33, 33' cover for example part of the channel 181D. However, other channels forming, for example utility channels, may be similarly covered. In the embodiment of FIG. 7 two cover plate sections 33 and 33' form a pair which have profiled edges facing each other to form a mounting groove or slot 34, for example for mounting and latching passenger seats. Reinforcement elements 30 may be installed as has been described above, not only in the lashing channels, but also in the other channels if necessary.

Figure 8:
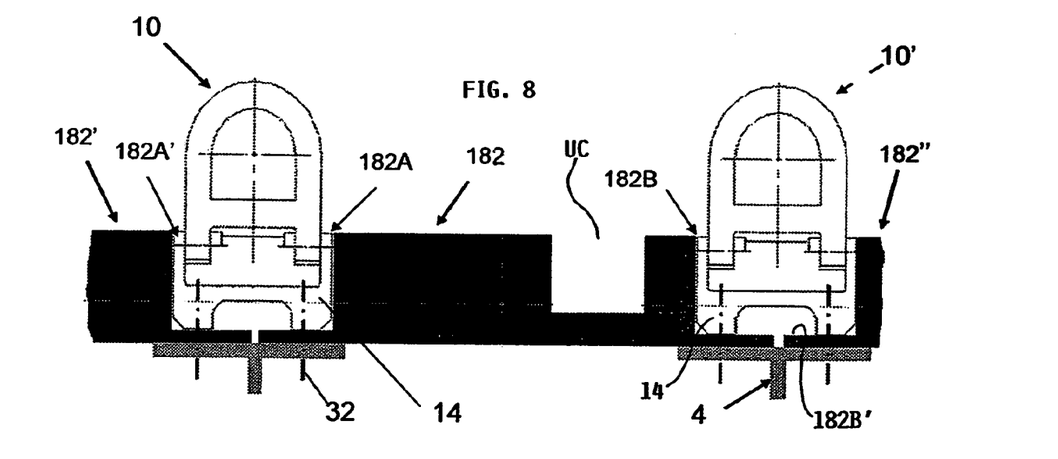
FIG. 8 is a sectional view similar to that of FIG. 5 but showing several loading floor panels each having at least one channel portion integrated into the respective panel so that two panels together form a complete channel.

FIG. 8 is a view similar to that of FIG. 5. However, in FIG. 8 three floor panels 182, 182', 182'' are interconnected by respective lashing devices 10 which bridge partial channels 182A and 182A' in the left part of FIG. 8 and partial channels 182B and 182B' in the right part of FIG. 8. Additionally, the panel 182 is provided with an extra channel UC that may be used as a utility channel, for example as a heat supply channel or a cable installation channel. For this purpose the utility channel in the panel 182 and any utility channels in neighboring panels are closed by respective covers.

Figure 9:
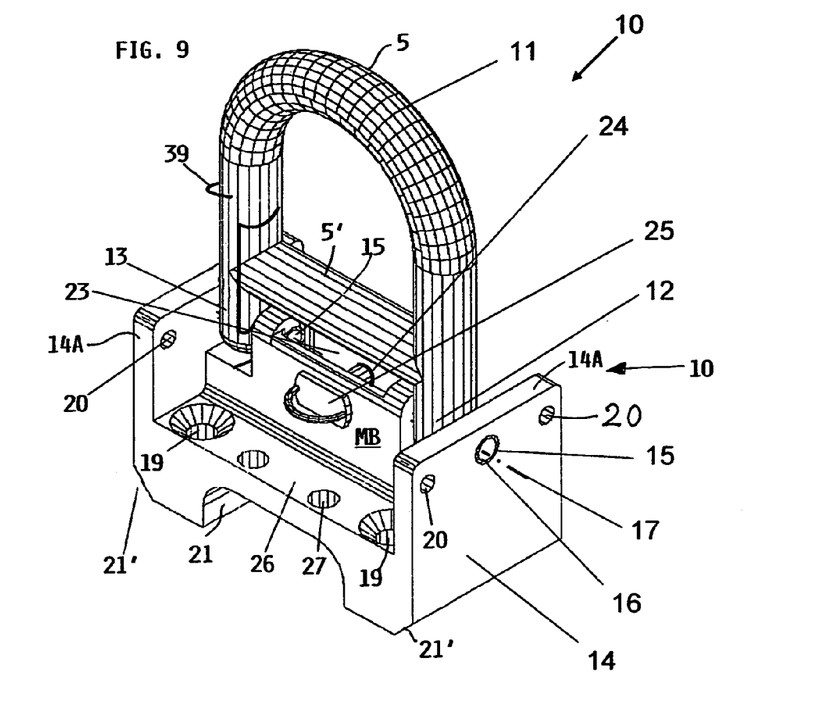
FIG. 9 is a perspective view illustrating a lashing device with its lashing bail in a working position.

FIG. 9 is a perspective view of one embodiment of a latching device 10. The latching device 10 has a lashing bail 11 and a base 14 with base side walls 14A provided with mounting holes 20 and a journal bore 15 holding a journal pin 16 having a journal axis 17. The base 14 comprises a support surface 26 for the cover plates 33 not shown in FIG. 9. Flathead screws, not shown, fit through mounting holes 19 for securing the base 14 to the lashing channel 18, not shown in FIG. 9, and to the frame 4. Holes 27, preferably threaded, serve for securing a cover plate to the support surface 26. A flow passage 21 facing downwardly toward the bottom of the lashing channel 18 is provided in the base 14 for drainage or heating purposes as described above. The passage 21 may have rounded corners as shown in FIG. 9 or squared corners if desired. A further flow passage is formed by a bevel 21' along the bottom edges of the base 14. However, these bevels 21' may be omitted. The opposite side wall of the base 14 has the same feature as the side wall facing the viewers.

A mounting block MB is centrally positioned between the side walls 14A of the base 14. The mounting block MB has a recess or socket 23 between block walls that are spaced from the base side walls 14A to form two spaces in which legs 12 and 13 of the lashing bail 11 are journalled by the journal pins 16 which extend through the base side walls 14A, through the legs 12 and 13 of the bail 11 and through the block walls of the mounting block MB. The journal pins 16 are axially aligned relative to the journal axis 17, but these journal pins 16 do not extend through the recess or socket 23 which is intended to receive an interconnecting member 31 as will be described in more detail with reference to FIG. 12. A bore 24 passes through the walls of the mounting block MB for receiving a locking bolt 25 that will also pass through the interconnecting element 31 inserted into the recess 23 when the lashing bail 11 is tilted into a recessed position shown in FIG. 10 thereby locking the element 31 in the socket 23.

Figure 10:
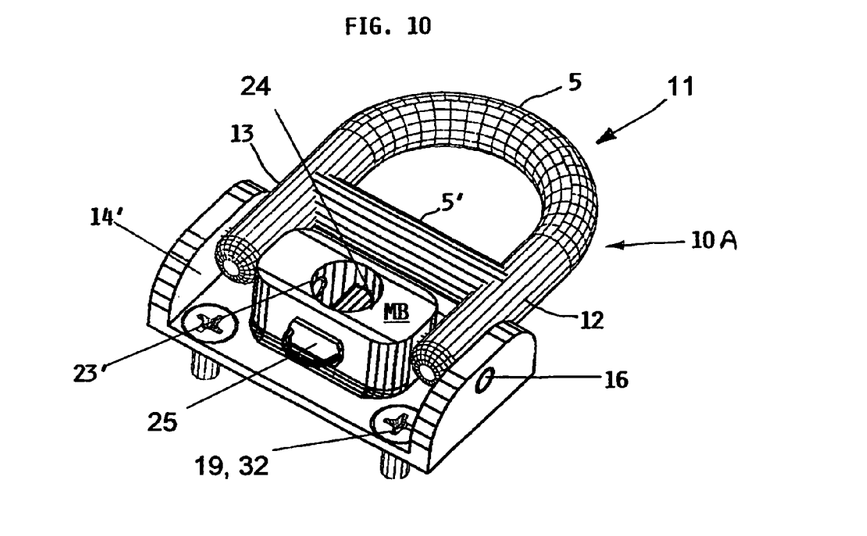
FIG. 10 illustrates a front view of a modified lashing device according to the invention with the lashing bail shown in a recessed position.

The mounting bail 11 comprises a ring portion 5 and the above mentioned legs 12 and 13 that are journalled to the base 14 as described above. The mounting bail 11 is reinforced by a crosspiece 5' interconnecting the legs 12 and 13 for an improved mechanical strength. At least one reset spring 39 is positioned and effective between the base 14 or mounting block MB and at least one leg 13 of the lashing bail 11 so as to maintain the lashing bail 11 in a recessed position as shown in FIG. 10. When the lashing bail 11 is tilted into a recessed rest position where it is held by the force of the reset spring 39, lashing bail 11 will retain its recessed position until intentionally moved back into the working position shown in FIG. 9. When the bail 11 is in the recessed position the recess 23 is accessible for inserting the interconnecting element 31.

FIG. 10 shows a modified lashing device 10A. The lashing bail 11 is constructed as described above with reference to FIG. 9. However, the base 14' of FIG. 10 does not have a drainage or flow passage 21 and the recess 23 has a circular cross-section rather than a rectangular cross-section, for receiving an interconnecting element also having a circular cross-section. In both instances the interconnecting element will be held in place by the locking bolt 25. The lashing bail 11 is shown in a recessed position as compared to the working position shown in FIG. 9. Incidentally, rather than making the recess 23 rectangular or circular in its cross-section, other cross-sectional configurations can be provided, for example a square cross-sectional configuration to receive square posts for interconnection to other components of the loading system when the lashing bail 11 is in the rest position as shown in FIG. 10.

It is not absolutely necessary that the base 14 has side walls. Where it is sufficient to mount the lashing devices 10 through the bottom of the lashing channel 18 to the supporting frame structure, it may not be necessary to additionally provide side walls which permit securing the lashing devices 10 to the floor panels. Thus, no lateral mounting screw holes 20 are necessary and hence no base side walls are necessary. Similarly, the flow passage 21 is needed only where contamination with liquids such as water are expected.

Figure 11:
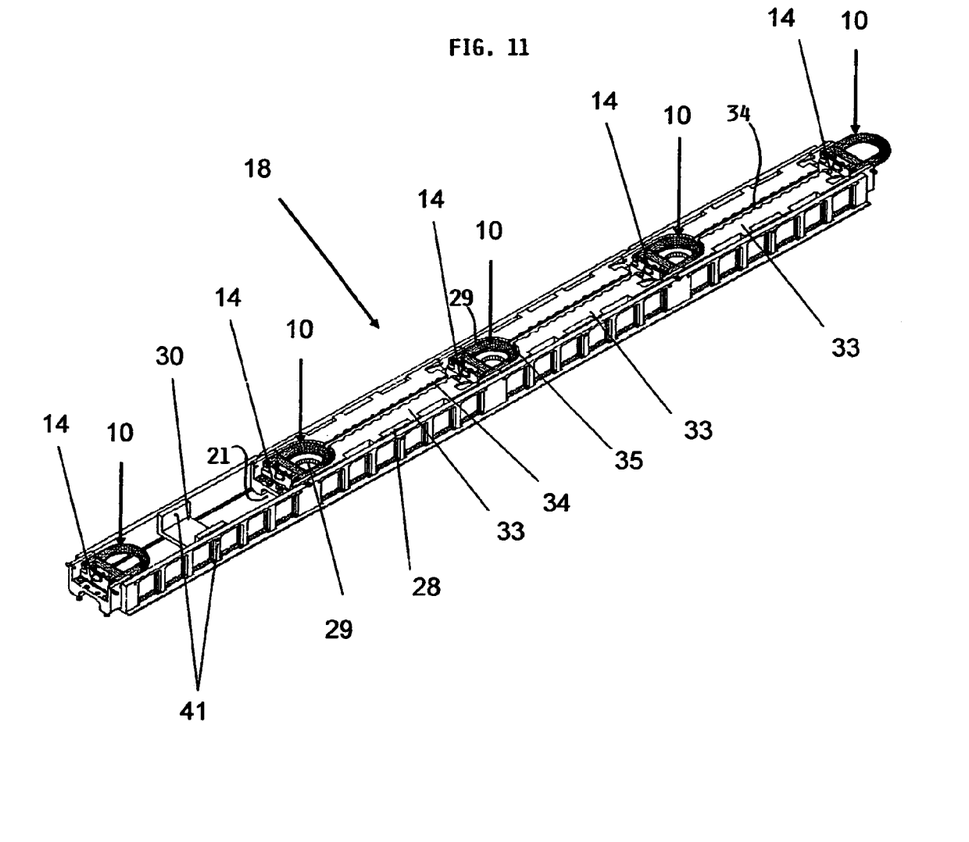
FIG. 11 is a perspective view of a lashing channel according to the invention provided with channel closing top or cover plates that are constructed for latching functional components to the channel.
Figure 15:
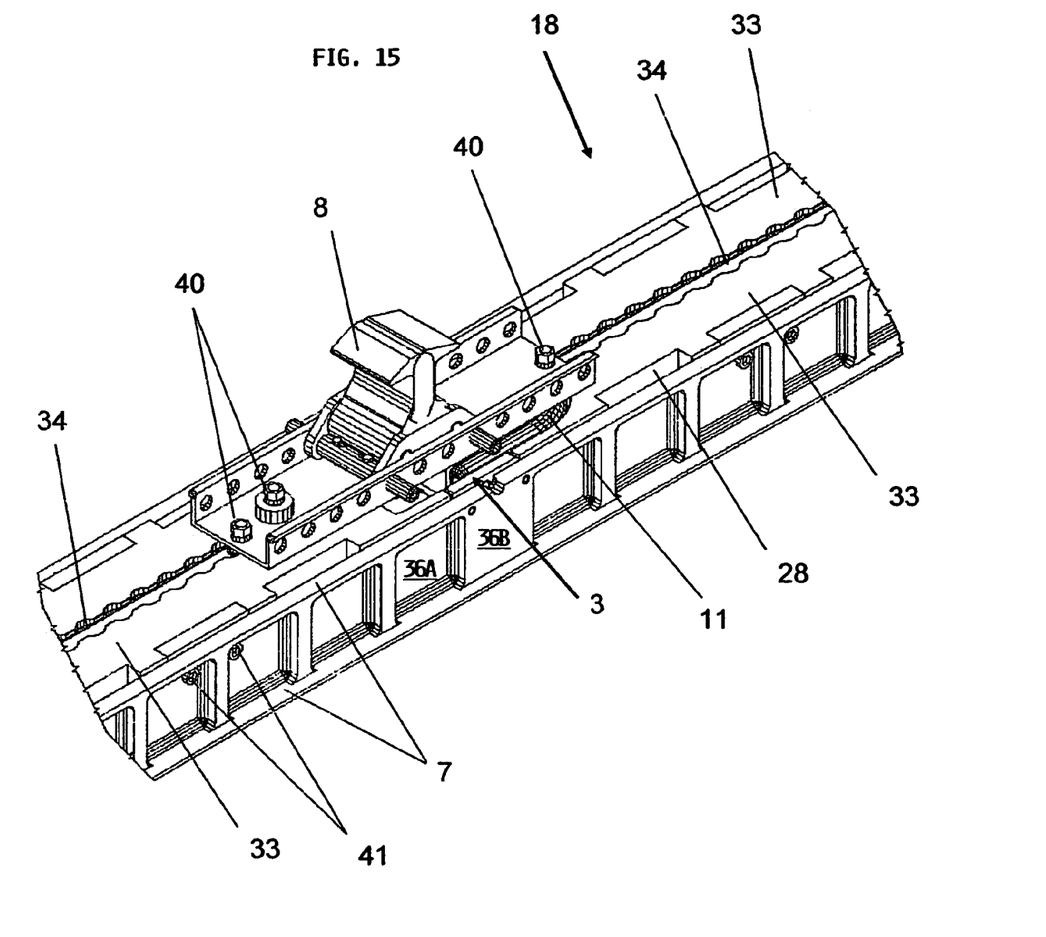
FIG. 15 shows a perspective view of a lashing channel according to the invention equipped with a latching element instead of a lashing element.

FIG. 11 is a perspective view of a lashing channel 18 similar to that of FIG. 2. In FIG. 11 cover or top plates 33, preferably constructed with a mounting or interlocking rail profile 34 for securing any one of a plurality of function components to the floor, are covering most of the lashing channel 18. The function components are equipped with interlocking elements that can cooperate with the interlocking rail profile 34 formed in the cover plates 33 or formed between two neighboring covering plate sections 33, 33' extending in parallel to each other. The locking profiles 34 are constructed as so-called dovetail profiles or seat rail profiles with insertion holes spaced from one another, for example by one inch. The dovetail profiles are positioned between neighboring insertion holes. Thus, not only passenger seats can be mounted to the floor, but also locking or latching elements 8, roller systems 6, or guide rails 7. FIG. 15 shows, for example, such a locking or latching element 8.

Where there are no requirements for mounting any components to the floor, the lashing channels 18 may be covered by plain channel covering panels without the interlocking rail profile 34. However, in both instances the covering plates or panels will be provided with cut-outs 28 shown in FIG. 11 for drainage purposes. Further drainage holes 29 are provided in the area of the lashing base 14 to permit liquid such as water to run into the lashing channel 18 and flow through the passages 21. FIG. 11 also shows that reinforcement elements 30 are mounted to the lashing channel 18 between neighboring lashing devices 10. Further, the covering plates 33 are provided with a cutout or recess 35 that will accommodate the bail 11 of the lashing device 10 when the bail 11 is tilted into the recessed position shown in FIG. 11. The reinforcement elements 30 are secured to the side walls of the lashing channel, for example by screws passing through the holes or bores 41. Preferably, the reinforcement elements 30 are somewhat recessed inside the channel 18 so that cover or mounting plates 33 either of the adapter type shown at 33 or other plane cover plates can rest with their edges on the upwardly facing ends of the reinforcement elements 30. The ends of any cover plate rest on the mounting surfaces 26 of the base 14.

Figure 12:
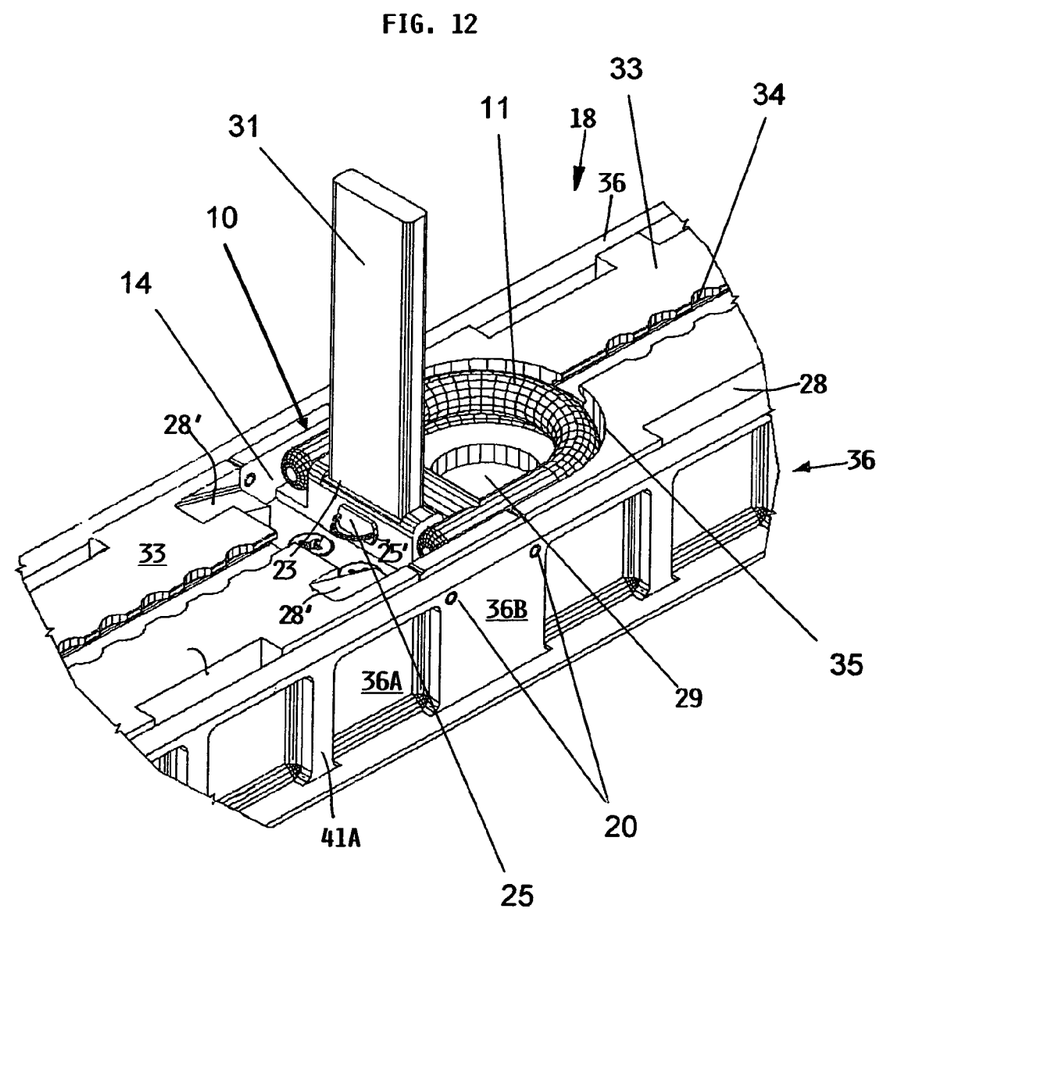
FIG. 12 is a perspective view of a channel portion with the lashing bail of a lashing device in a recessed position and with an interconnecting element mounted in the base of the lashing device.

FIG. 12 shows on an enlarged scale the insertion of an interconnecting element 31 into the recess or socket 23. The interconnecting element 31 is locked in place by the locking bolt 25 provided with a handle for easy insertion and withdrawal. In addition to the water inlet cut-outs 28 in the cover plate 33, ramps 28' may be provided at the ends of the cover plates 33 next to the lashing devices 14 to facilitate water flow down into the channel 18 for proper drainage through flow passages as mentioned above. FIG. 12 also shows that weight reductions are achieved by recesses 36A in the side walls 36. The recesses 36A are so positioned and dimensioned that intermediate lands 36B have a sufficient size for the mounting holes 20 to secure the lashing devices 10 to the lashing channel 18 and to the floor panels. The channel cover plates 33 are provided with holes 29 for drainage into the channel 18. Preferably, the holes 29 are positioned within the recess 35 into which the bail 11 can be recessed.

Figure 13:
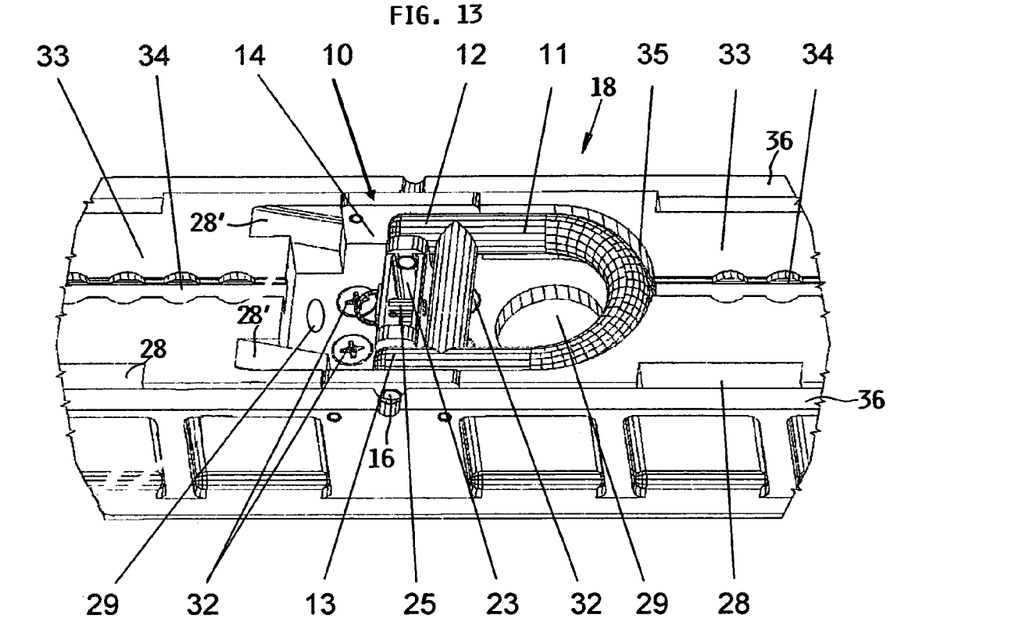
FIG. 13 is a perspective view similar to that of FIG. 12, but with the interconnecting element removed.

FIG. 13 is a view similar to that of FIG. 12, however showing the mounting recess or socket 23 in the base 14 without an interconnecting element, thus showing the rectangular cross-sectional configuration of the recess or socket 23.

Figure 14:
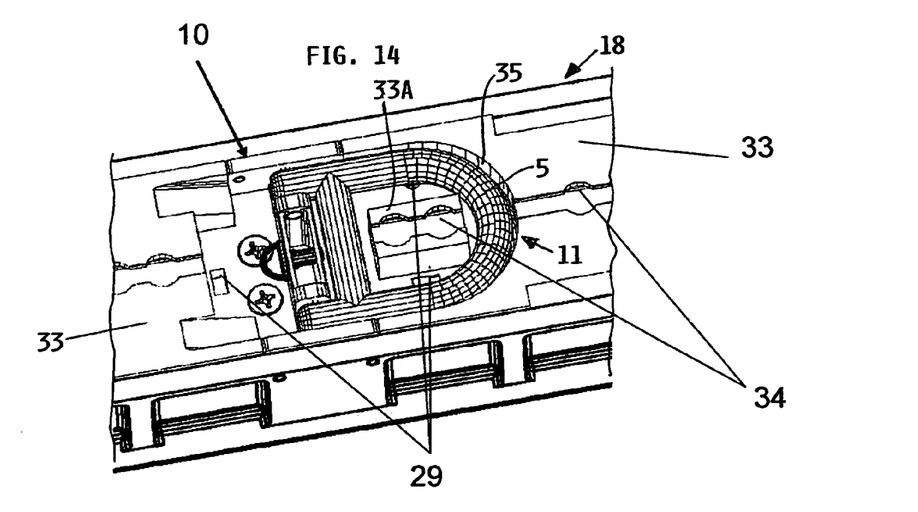
FIG. 14 is a view similar to that of FIG. 13, however illustrating different positions for drainage holes in the lashing device and showing an extension of a latching device.

FIG. 14 is a view similar to FIG. 13, however the large drainage hole 29 has been replaced by a plurality of smaller drainage holes 29 in the vicinity of the lashing device 10. Further, an extension block 33A of the adapter or cover plate 33 is positioned within the area surrounded by the bail 11 in its recessed position. The block 33A has an adapter or mounting rail profile 34 with insertion holes and at least one locking dovetail section. The block 33A is so positioned and dimensioned that the ring portion 5 fits into the space between the block 33A and the plates 33.

The use of the lashing channel 18 as a drainage system assures that any liquid such as water cannot become a standing pool in the system, whereby the corrosion characteristics of the channel and of the components mounted in the channel are improved.

The adapter or mounting rail profile 34 may be formed either as a throughgoing slot or as a groove that does not go entirely through an adapter cover plate 33. When the profile 34 does not pass through the plate 33, it is possible to simply turn the plate 33 by 180° around its length axis so that the mounting profile 34 faces into the channel 18 and a smooth cover surface faces upwardly where any mounting of components to the channel is not required.

FIG. 15 shows the mounting of a functional component such as a latching or locking device 8 to the channel 18 by mounting screws 40 that cooperate with the rail profile 34. The latching or locking element 8 is particularly constructed for tying down standardized freight containers, thereby increasing the versatility of the present latching channels.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims.

What is claimed is:

1. An apparatus for lashing a structural component to a loading floor, of a transport conveyance, said apparatus comprising a lashing channel (18) including two channel side walls (36) and a channel bottom plate (37) interconnecting said channel side walls, a plurality of lashing devices (10) mounted spaced from one another at recessed lashing positions in said lashing channel (18) for lashing freight items to said loading floor, each of said plurality of lashing devices (10) comprising a base (14) and a lashing bail (11) journalled to said base (14), a channel cover removably secured to said base (14), and a recess (35) in said channel cover, said recess (35) being dimensioned and positioned to receive said lashing bail (11) when said lashing bail is tilted into said recess (35).

2. The apparatus of claim 1, wherein said lashing positions are uniformly spaced from one another along said lashing channel (18).

3. The apparatus of claim 1, wherein each said lashing bail (11) comprises a ring portion (5) and two legs (12, 13) interconnected by said ring portion (5), and a journal journalling said two legs (12, 13) to said base (14).

4. The apparatus of claim 1, wherein said base (14) further comprises a mounting (23) for securing an interconnecting element (31) to said base, wherein said mounting (23) comprises a receptacle for said interconnecting element, and wherein said receptacle assumes a use position when said lashing bail is in a recessed position in said lashing channel.

5. The apparatus of claim 4, further comprising a cross-bore (24) in said base (14), said cross-bore (24) having a central axis extending through said receptacle, said cross-bore (24) being adapted for receiving a latching bolt (25) for locking said interconnecting element (31) in said receptacle.

6. The apparatus of claim 3, wherein said base (14) comprises a groove (21) in a base bottom for forming a flow channel for drainage or heating.

7. The apparatus of claim 1, wherein said base (14) comprises mounting bores (19) for securing said lashing devices (10) in said lashing channel (18).

8. The apparatus of claim 1, wherein said channel cover (33) comprises two channel cover plate sections (33), and wherein said base (14) comprises a mounting surface (26) and mounting elements (19, 27) in said base (14) removably securing said two channel cover plate sections to said mounting surface (26) of said base (14).

9. The apparatus of claim 1, wherein said channel cover (33) is a channel closure cover comprising openings (28, 29) for drainage.

10. The apparatus of claim 1, wherein said channel cover comprises two channel cover plate sections, each plate section of said two plate sections having a profiled edge (34) so that two profiled edges facing each other form a profiled groove or slot (34) for mounting said structural component in said profiled groove or slot (34).

11. The apparatus of claim 10, wherein said profiled edges are adapted for mounting passenger seats.

12. The apparatus of claim 10, wherein said profiled groove or slot (34) of said two plate sections is adapted for mounting function elements (8) to said loading floor.

13. The apparatus of claim 1, wherein said channel cover comprises two channel cover plate sections (33) comprising a flat surface on one side and a mounting rail profile (34) on the opposite side, and wherein said channel plate sections (33) are reversible so that said two plate sections function as one of a channel cover plate and a component mounting plate.

14. The apparatus of claim 1, wherein said lashing channel further comprises top flanges (38) extending laterally outwardly from and along top side wall edges of said lashing channel for supporting a floor panel.

15. The apparatus of claim 14, further comprising securing elements (45) along said laterally outwardly extending top flanges (38) for securing floor panels to said laterally outwardly extending top flanges (38).

16. The apparatus of claim 14, wherein said lashing channel (18) further comprises laterally outwardly extending bottom flanges along bottom corners of said lashing channel (18) for supporting a floor panel.

17. The apparatus of claim 1, wherein said lashing channel (18) further comprises laterally outwardly extending bottom flanges along bottom corners of said lashing channel (18) for supporting a floor panel.

18. The apparatus of claim 1, wherein said lashing channel has a U-shaped cross-sectional configuration.

19. The apparatus of claim 1, wherein said channel bottom plate (37) comprises securing elements (32) for attaching said lashing channel (18) to a support member (4) in said transport conveyance.

20. The apparatus of claim 19, wherein said securing elements (32) are positioned for securing any lashing device of said plurality of lashing devices (10) to said lashing channel (18) and said lashing channel to said support member (4).

21. The apparatus of claim 1, further comprising at least one channel reinforcing load take-up member (30) mounted in said lashing channel between two neighboring lashing devices (10) of said plurality of lashing devices.

22. A combination comprising the apparatus of claim 1 and further comprising a floor panel (180), wherein said lashing channel (180A) is integrated into said floor panel (180), and wherein said channel side walls and said channel bottom plate are formed by said floor panel (180), and wherein said channel cover is positioned between neighboring ones of said lashing devices (10).

23. The combination of claim 22, further comprising at least one channel reinforcing load take-up member (30) mounted in said lashing channel between two of said neighboring lashing devices.

24. The combination of claim 22, further comprising mounting elements (32) in said channel bottom plate for securing said floor panel (180) and said lashing channel integrated in said floor panel to a support member (4) in said transport conveyance.

25. A combination comprising the apparatus according to claim 1 and further comprising at least one first floor panel section and at least one second floor panel section, said first and second floor panel sections extending in is parallel to each other, said first floor panel section having at least one first recess along one longitudinal panel edge of said first floor panel section, said second floor panel section having at least one second recess along one longitudinal panel edge of said second floor panel section, said first and second recesses together forming said lashing channel.

26. The combination of claim 25, further comprising securing elements (32) and wherein said base (14) of said lashing devices and said securing elements (32) are so positioned that said base (14) and said securing elements together interconnect said first and second floor panel sections with each other and with said loading floor.

27. The combination of claim 25, wherein said base (14) of said lashing devices each comprises at least one groove (21) passing through a bottom of said base (14), said at least one groove (21) forming a flow passage.

28. The combination of claim 27, wherein said flow passage is a liquid draining passage in said lashing channel.

29. The combination of claim 27, wherein said flow passage forms a heat supply passage in said lashing channel.

* * * * *